Sept. 5, 1933.   B. H. SHINN   1,925,610
PRESSURE OPERATED TWO-WAY VALVE
Filed Jan. 14, 1930   3 Sheets-Sheet 1

Inventor
Byron H. Shinn

By Fisher Pedersen
Attorneys

Sept. 5, 1933.  B. H. SHINN  1,925,610
PRESSURE OPERATED TWO-WAY VALVE
Filed Jan. 14, 1930   3 Sheets-Sheet 3

Inventor
Byron H. Shinn
By
Fisher Pedersen  Attorney

Patented Sept. 5, 1933

1,925,610

UNITED STATES PATENT OFFICE 1,925,610

PRESSURE OPERATED TWO-WAY VALVE

Byron H. Shinn, Washington, Pa., assignor to Shinn Devices Corporation, Washington, Pa., a corporation of Delaware Application January 14, 1930. Serial No. 420,756

23 Claims. (Cl. 137—153)

This invention is an automatic pressure operated two way valve, which when the pressure is below a certain predetermined point, will be in one position and which will automatically reverse itself when the pressure exceeds that predetermined point.

The valve is capable of use in any situation where its function might be of use, one such instance being in a hydraulic jack, as set forth in my application, Serial Number 375,534, filed July 2, 1929, or in a hydraulic braking system as set forth in my application, Serial Number 355,852, filed April 17, 1929.

The invention comprises essentially a housing member having a cylindrical pressure chamber, entry to which is controlled by two inwardly opening spring loaded inlet valves. These two valves open and close alternately, so that when one is closed, the other is open, and vice versa. One of the valves is connected to a source of low pressure, and the other is connected to a source of high pressure.

The common pressure chamber is in communication with the system, and the high or low pressure is connected to the system, depending upon the pressure existing in the pressure chamber.

The position of the two valves is controlled by a pressure responsive element in communication with the pressure chamber and operatively connected to the two valves. When the pressure is low, the pressure responsive element holds the high pressure inlet valve closed and allows the other one to open; when the pressure exceeds a certain predetermined value, the pressure responsive element closes the low pressure valve and allows the high pressure valve to open and so puts the high pressure in communication with the system. When the pressure drops below the predetermined value, the valve again reverses itself and puts the low pressure supply in communication with the pressure chamber and system, and closes the high pressure valve.

The general features of the valve assembly having been thus indicated, the invention will be more particularly described by reference to the accompanying drawings illustrating several ways of carrying out the invention. It should be understood that the invention is not to be limited to the precise details here shown, but that it may be carried out in other ways.

In these drawings, Figure 1 is a sectional view showing one form of the valve;

Figure 5 is a sectional view showing still another modification.

Figure 1:
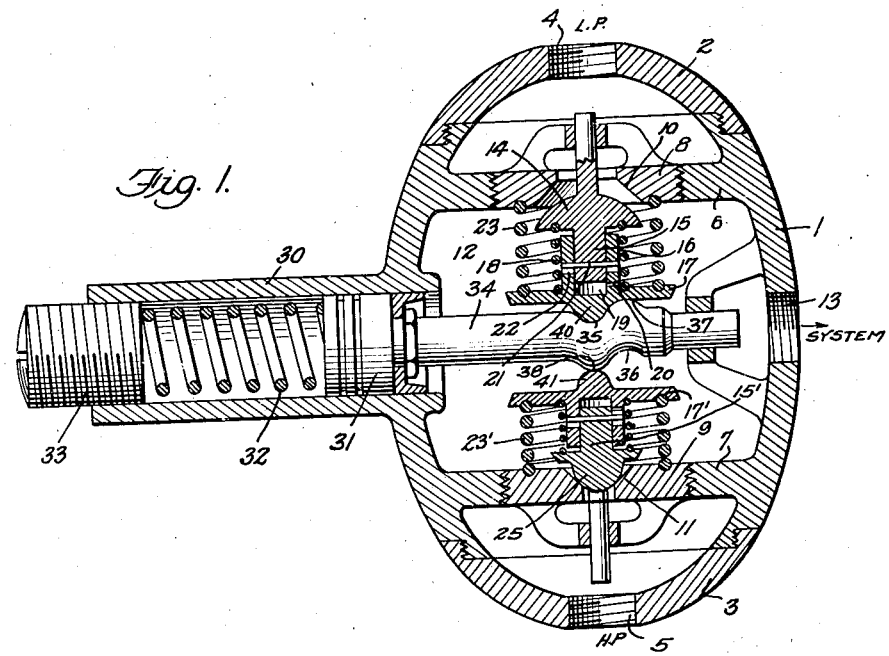

Referring now to these drawings in which similar reference characters indicate similar parts, valve housing 1 comprises cap members 2 and 3, 2 being supplied with an opening 4 for connection with the source of low pressure fluid, while 3 is provided with an opening 5 for connection to a source of high pressure fluid.

The housing is provided with internal annular shelves 6 and 7, which carry valve seat members 8 and 9, provided respectively with valve seats 10 and 11. Members 6, 7, 8 and 9 define a central pressure chamber 12, which is provided with an opening 13 adapted to be connected to the system.

A low pressure valve 14 is adapted to seat on the valve seat 10; 14 is provided with an extension 15 which telescopes with a cylindrical member 16, which in turn is provided with a disc member 17. A spring 18 is positioned between 14 and 17 for urging them in opposite directions. The cylinder 16 is provided with a space 19, forming a fluid cushion space, the pressure from which may be relieved through a small passage 20.

The extension 15 is provided with a pin 21 which has limited movement in slots 22 in the cylindrical member 16. A spring 23 is positioned between the disc 17 and the member 8 for urging 17 toward the center of the pressure chamber 12.

The other valve 25, and its associated parts are constructed in the same way as the valve 14 and its associated parts, except that 25, being a high pressure valve, is somewhat smaller than 14. Corresponding parts are indicated by primed numerals.

A housing 1 is provided with a cylindrical extension 30 in which the pressure responsive piston 31 moves, against the resistance of a spring 32, the load on which can be regulated by changing the position of the threaded plug 33; the piston 31 is rigid with a cam rod 34 which is provided with staggered depressions 35 and 36 and staggered cams 37 and 38, so that one depression is directly opposite one cam. The depressions and cams on the cam rod 34 co-operate with an extension 40 on the disc 17 and with an extension 41 on the disc 17', in such a way, as shown in Figure 1, that when the cam rod is to the right, 40 is in depression 35, and 41 is against cam 38, the result of which is that valve 14 may move, while the valve 25 is locked.

The described parts operate as follows: When the pressure in chamber 12 exceeds a certain predetermined amount, the piston 31 moves to the left, cam 37 coming directly underneath 40, thus locking the low pressure valve 14, while depression 36 receives cam 41 and releases the high pressure valve 25.

The above described reversal of the valves by movement back and forth of the cam rod 34 is entirely automatic, and is determined by the pressure existing in the pressure chamber 12.

The fluid space 19 with its exit passage 20 provides a fluid cushion or dash pot effect for eliminating a bumping or hammer effect when the valves open and close. The lost motion connection between a valve and its disc 17 or 17' gives a very slight delay in the opening and closing of the valves, so that the valve being closed lags a very little behind the valve being opened.

Figure 2:
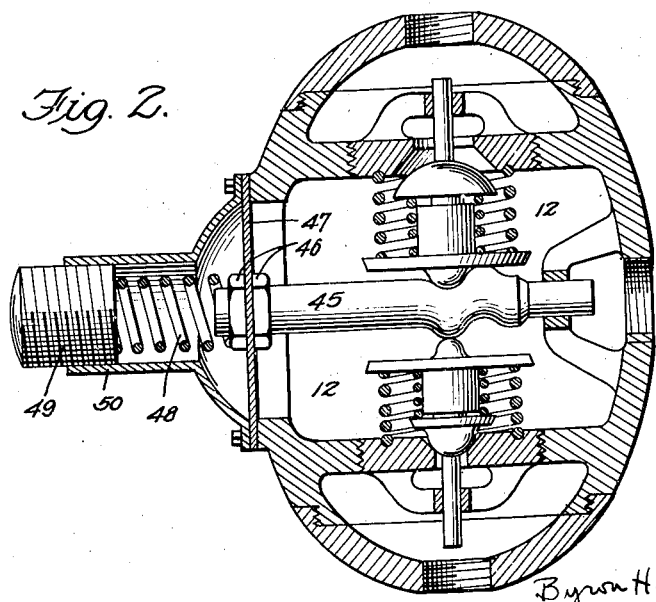
Figure 2 shows a modification.

The modification illustrated in Figure 2 is concerned primarily with the pressure responsive element; the cam rod 45, corresponding to the cam rod 34 of Figure 1, is secured by nuts 46 to a diaphragm 47, at one side of the pressure chamber 12, the diaphragm being spring loaded by spring 48, the effective force of which can be controlled by the threaded plug 49, engageable in the threaded extension 50. The cam rod 45 in this modification, it will readily be seen, is responsive to the pressure in the pressure chamber 12, and is actuated back and forth in the same way as cam rod 34 as described in connection with Figure 1.

Figure 3:
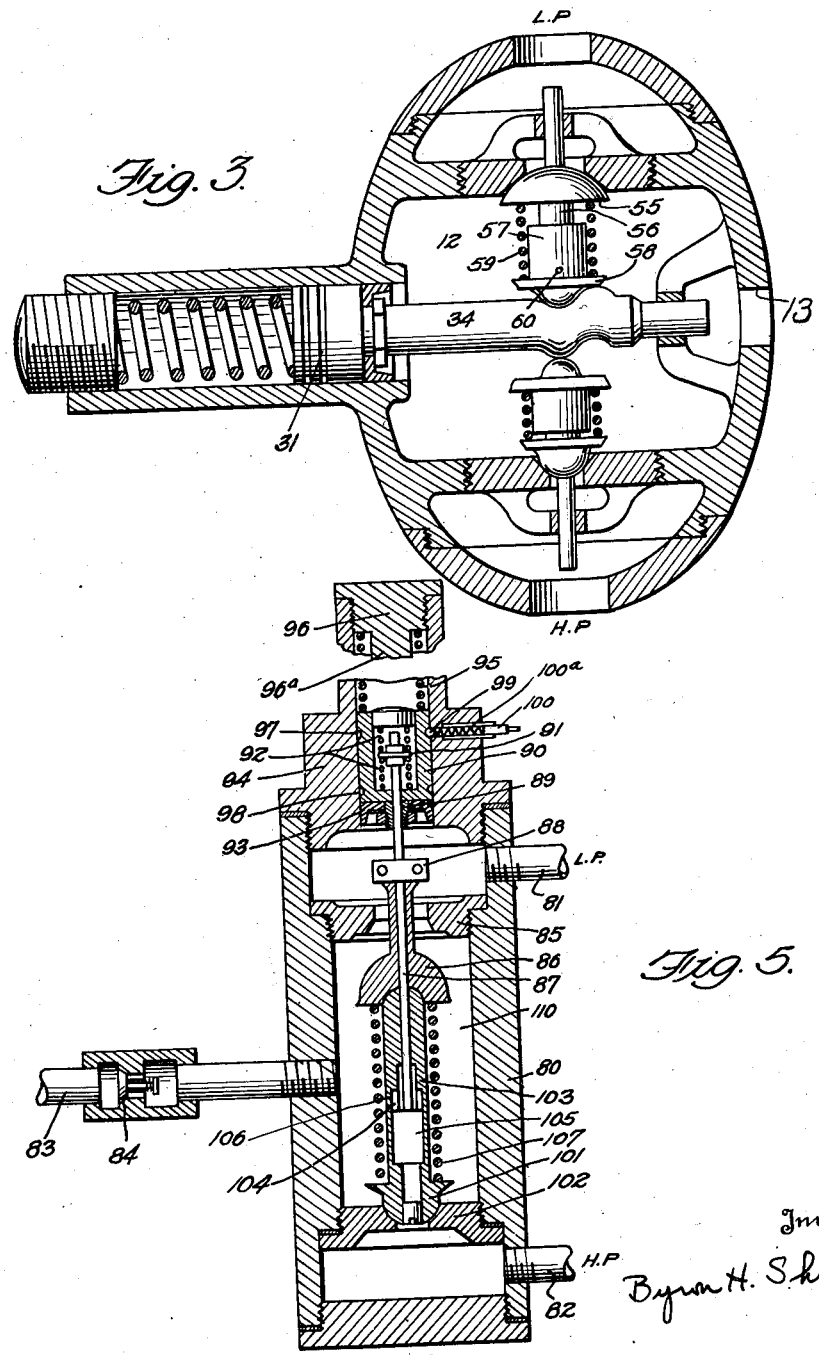
Figure 3 is a sectional view showing another modification.

In all forms of the invention, except Fig. 3, the valves allow flow of fluid to or from the system, in either direction. The construction of Fig. 3 is used where the fluid flow through port 13 is in one direction only.

The form of the invention shown in Figure 3 is a simplification of the form shown in Figure 1, in that the springs 23 of Figure 1 are omitted, and the pin 21 of Figure 1 is omitted.

In this figure, the low pressure valve 55 has an extension 56 which telescopes into a cylindrical member 57, which terminates in a disc 58, 55 and 58 being urged apart by a spring 59. A small passage 60 is provided for the inflow and outflow of fluid to the interior of the cylindrical member 57. The cam rod 34 is controlled by a piston 31 as described in connection with Figure 1.

Figure 4:
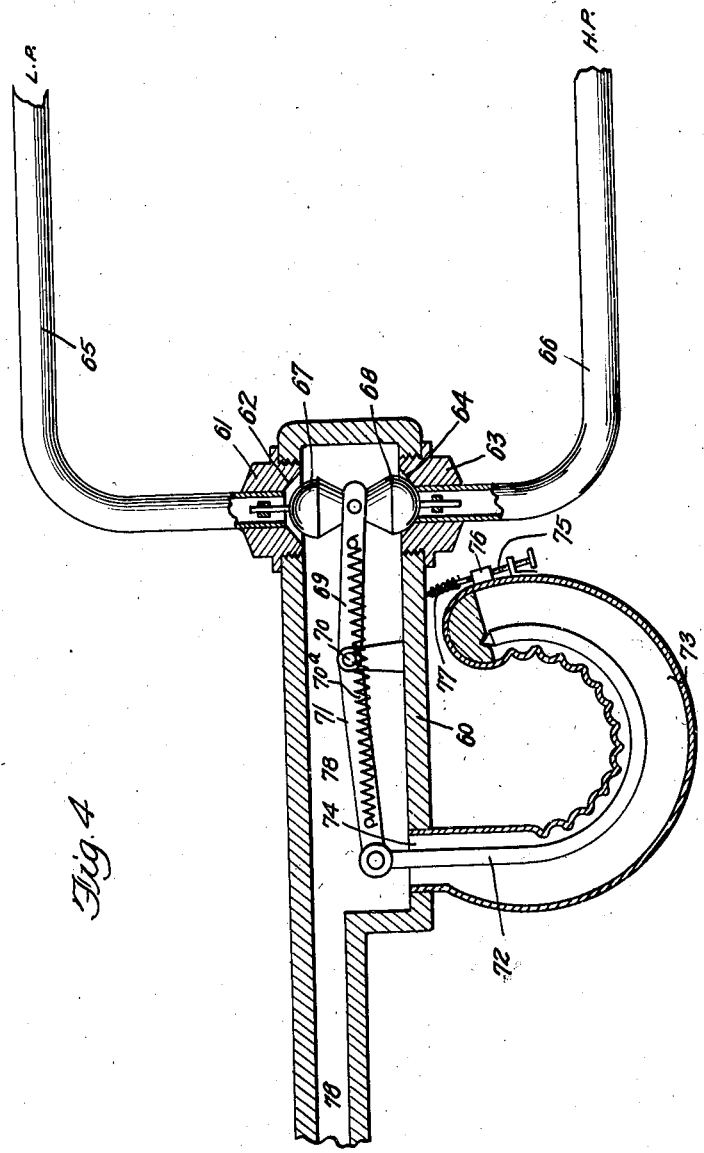
Figure 4 is a sectional view showing another modification.

In the modification shown in Figure 4, the valve housing indicated generally at 60 is provided with an insert 61, forming the valve seat 62, and with an insert 63 forming the valve seat for a high pressure valve 64. A low pressure pipe 65 and a high pressure pipe 66 lead fluid to the respective valve seats.

The valve itself comprises two heads 67 and 68, made to move together to seat respectively and alternately against the two valve seats 62 and 64.

Connected with the valve is an arm 69 which is pivoted on pivot 70. An arm 71 is pivoted on pivot 70. A spring 70a has its ends respectively connected near the outer ends of arms 69 and 71, which spring will hold the valves 67 and 68 up or down, depending upon the position of the arm 71.

Outer end of the arm 71 is connected to a bendable rod 72, forming part of a pressure responsive element 73 of the Bourdon type. This pressure responsive element is in communication with the pressure existing in the valve chamber through the passage 74. An adjustment of the pressure responsive element 73 may be effected by a threaded element 75, threaded through the collar 76 and connected with the spring 77.

This modification operates as follows: With the parts as shown in Figure 4, pressure from the low pressure pipe 65 is delivered to the pressure chamber 78 and then through pipe 78 to the system. As the pressure builds up in the pressure chamber and in the system, the flexible tube 73 tends to straighten out, and raises the outer end of the arm 70, until the spring 70a gets past the pivot 70, and then the spring will snap arm 69 upwardly to seat valve 67 and unseat valve 68. When the pressure drops, the operation will be reversed, rod 72 moving downwardly, which will move arm 70 downwardly; when the spring 70a gets past dead center, it will snap valves 67 and 68 back to their original positions.

Figure 5 shows a modification of the valve assembly, working on the same general principle as the other forms.

In Figure 5, the valve casing 80 is provided with an inlet pipe 81 connected to a source of low pressure and with an inlet pipe 82 connected to a source of high pressure. The outlet pipe 83 to the system is optionally provided with a check valve 84. 85 is a valve seat for a valve 86, which moves on a rod 87, carrying a stop 88. The upper end of rod 87 passes through bushing 89 of piston 90. The upper end of the rod carries a washer 91, against which springs 92 bear on opposite sides thereof.

The piston has a seal or cup member 93 and moves in a cylinder 94 against spring 95, the force of which is adjustable by the screw plug 96. The upward movement of the piston is limited by the abutment 96a, carried by 96.

The piston 90 is provided with upper and lower annular grooves 97 and 98, engageable by a spring pressed detent 99, the pressure on which is controlled by a screw plug 100 and spring 100a.

The high pressure valve 101 seats against valve seat 102, the valve having a hollow stem 103, which seats in the under side of valve 86. The top end of the stem 103 acts as a valve to prevent fluid leakage past rod 87. The rod 87 passes into the stem 103 and into space 104 therein, the rod terminating in a head 105 adapted to bear against shoulder 106 in the stem 103. A spring 107 is positioned between valves 86 and 101 and is sufficiently strong to hold valve 101 closed against the high pressure fluid from 82. The parts just described operate as follows:

High pressure valve 101 is held closed by a spring 107, which in turn is held by valve 86 and spring 95. Low pressure fluid from pipe 81 passes through the valve chamber 80, and out pipe 83. When the pressure in the system has reached a point sufficient to overcome the spring 95, and detent 99, the piston 90 moves upwardly, valve 86 also moving upwardly by the push of spring 107, thus seating valve 86 and shutting off the low pressure fluid from 101. Valve 101 is still held closed by spring 107. This movement is accomplished when the lower groove 98 is about halfway up to detent 99. This halfway movement is also sufficient to cause head 105 to move up to and engage the shoulder 106. As the piston 90 continues upwardly, head 105, engaging with 106, lifts the high pressure valve 101 off its seat, thereby allowing the high pressure fluid to flow into the pressure chamber 110 in the valve casing. Valve 86 is now held firmly against its seat by the high pressure fluid, and by the detent 99 now in engagement with the lower groove 98 of the piston 90. The parts remain in this position as long as the high pressure continues. When the pressure falls below a certain predetermined point, the spring 95 pushes the piston down and restores the parts to the position shown in Figure 5.

The detent 99 has a certain frictional grip on the piston 90 which may be regulated by making the grooves 97 and 98 of appropriate depth.

The detent 99 also engages with the grooves 97 and 98, so that it tends to retain the piston in either its upper or lower position until a slight excess pressure is built up, whereby, when the detent lets go, this excess pressure moves the piston with a quick snap action to its new position.

While the invention has been described in some detail, it should be understood that the invention is not to be limited to these details, but may be carried out in other ways.

I claim as my invention:

1. In a pressure responsive valve apparatus, in combination, a pair of valves in a common chamber, one valve loaded to open at a relatively low pressure, another valve loaded to open at a higher pressure, and pressure responsive mechanical means for alternately putting the valves in operation.

2. In a pressure responsive valve apparatus, in combination, a valve chamber containing a valve loaded to open at a relatively low pressure, a valve loaded to open at a higher pressure, and pressure responsive mechanical means for alternately locking the valves against movement.

3. In a pressure responsive valve apparatus, in combination, a valve loaded to open at a relatively low pressure, a valve loaded to open at a higher pressure, a common chamber for said valves, and a pressure controlled mechanical device engageable with the valves, for simultaneously opening the one valve and closing the other valve.

4. In a pressure responsive valve apparatus, in combination, a pair of valves communicating with a common chamber, a pressure responsive mechanical device communicating with said chamber, and engageable with the two valves, for throwing them into and out of operation alternately.

5. In a pressure responsive valve apparatus, in combination, a pair of spring loaded valves communicating with a common chamber, a pressure responsive mechanical device communicating with said chamber, and engageable with the two valves, for throwing them into and out of operation alternately.

6. In a pressure responsive valve apparatus, in combination, a pair of valves communicating with a common chamber, and arranged to move back and forth in substantially the same line, a pressure responsive device communicating with said chamber, and means controlled by the pressure responsive device and operatively connected with both valves, arranged to move back and forth in a line substantially perpendicular to the line of movement of the valves.

7. In a pressure responsive valve apparatus, in combination, a pair of valves communicating with a common chamber, and arranged to move back and forth in substantially the same line, a pressure responsive device communicating with said chamber, and a cam rod controlled by the pressure responsive device and operatively connected with both valves, arranged to move back and forth in a line substantially perpendicular to the line of movement of the valves.

8. In a pressure responsive valve apparatus, in combination, a source of high pressure, a source of low pressure, a pressure chamber, a valve controlling the inlet of high pressure to the pressure chamber, a valve controlling the inlet of low pressure to the pressure chamber, and pressure responsive mechanical means for alternately locking the valves against operation.

9. In a pressure responsive valve apparatus, in combination, a source of high pressure, a source of low pressure, a pressure chamber, a valve controlling the inlet of high pressure to the pressure chamber, a valve controlling the inlet of low pressure to the pressure chamber, and pressure responsive mechanical means for switching the valves alternately into and out of operation.

10. In a pressure responsive valve apparatus, in combination, a source of high pressure, a source of low pressure, a pressure chamber, a valve controlling the inlet of high pressure to the pressure chamber, a valve controlling the inlet of low pressure to the pressure chamber, and pressure responsive mechanical means for simultaneously closing the one valve and opening the other.

11. In a pressure responsive valve apparatus, in combination, a valve loaded to open at a relatively low pressure, a valve loaded to open at a higher pressure, pressure responsive means operatively connected with the two valves for controlling their operation, and a lost motion connection between the pressure responsive means and each of the valves.

12. In a pressure responsive valve apparatus, in combination, a valve loaded to open at a relatively low pressure, a valve loaded to open at a higher pressure, pressure responsive means operatively connected with the two valves for simultaneously closing the one and opening the other, and a lost motion connection between the pressure responsive means and each of the valves.

13. In a pressure responsive valve apparaus, in combination, a pressure chamber, a pair of valves opening into the pressure chamber, each valve comprising two elements urged apart by a spring interposed therebetween, and pressure responsive means for simultaneously closing the one valve and opening the other.

14. In a pressure responsive valve apparatus, in combination, a pressure chamber, a pair of valves opening into the pressure chamber, each valve comprising two elements urged apart by a spring interposed therebetween, and pressure responsive means, engageable with one member of each valve, for simultaneously closing the one valve and opening the other.

15. In a pressure responsive valve apparatus, in combination, a pressure chamber, a pair of valves opening into the pressure chamber, each valve comprising two elements urged apart by a spring interposed therebetween, a lost motion connection between the two valve elements, and pressure responsive means for simultaneously closing the one valve and opening the other.

16. In a pressure responsive valve apparatus, in combination, a pressure chamber, a pair of valves opening into the pressure chamber, each valve comprising two elements urged apart by a spring, pressure responsive means, engageable with one element of each valve, for simultaneously closing the one and opening the other, and springs for urging said one element of each valve into engagement with the pressure responsive means.

17. In a pressure responsive valve apparatus, in combination, a pressure chamber, a pair of valves opening into the pressure chamber, each valve comprising two elements urged apart by a spring, a lost motion connection between the two elements of each valve, pressure responsive means, engageable with one element of each valve for simultaneously closing the one and opening the other, and springs for urging said one element of each valve into engagement with the pressure responsive means.

18. In a pressure responsive valve apparatus, in combination, a pressure chamber, a pair of valves opening into the pressure chamber, each valve comprising plug and cylinder elements which telescope, said elements being urged apart by a spring, pressure responsive means, engageable with one element of each valve, for simultaneously closing the one valve and opening the other valve, and springs for urging one portion of each valve into engagement with said pressure responsive means.

19. In a pressure responsive valve apparatus, in combination, a pressure chamber, a pair of valves opening into the pressure chamber, each valve comprising plug and cylinder elements which telescope, said elements being urged apart by a spring and provided with a lost motion connection therebetween, pressure responsive means engageable with one element of each valve, for simultaneously closing the one valve and opening the other valve, and springs for urging one portion of each valve into engagement with said pressure responsive means.

20. In a pressure responsive valve apparatus, in combination, a valve loaded to open at a relatively low pressure, a valve loaded to open at a higher pressure, pressure responsive means operatively connected with the two valves for simultaneously closing the one and opening the other, and a lost motion connection co-operating with the valves for effecting the opening of the high pressure valve only after the low pressure valve has been closed.

21. In a pressure responsive valve apparatus, in combination, a valve loaded to open at a relatively low pressure, a valve loaded to open at a higher pressure, pressure responsive means operatively connected with the two valves for simultaneously closing the one and opening the other, and a lost motion connection associated with the high pressure valve for causing it to lag a small amount in opening, whereby it opens only after the low pressure valve has closed.

22. In a pressure-responsive valve apparatus, a valve casing, a high pressure valve and a low pressure valve, each valve being made in two relatively movable parts with a spring between the parts for urging them apart, and means responsive to the pressure in the valve casing, for alternately moving the valves to closed position.

23. In a pressure-responsive valve apparatus, a valve casing, a high pressure valve and a low pressure valve, each valve being made in two relatively movable parts with a spring between the parts for urging them apart, and means located between the valves and responsive to the pressure in the valve casing, for alternately moving the valves to closed position.

BYRON H. SHINN.